July 11, 1967

J. H. WILSON 3,330,164

PIPE ROTATING DEVICE WITH GEAR SHIFT ARRANGEMENT

Filed Dec. 15, 1964

JOHN HART WILSON
INVENTOR.

BY
*Wayland D. Keith*
HIS AGENT

July 11, 1967 J. H. WILSON 3,330,164
PIPE ROTATING DEVICE WITH GEAR SHIFT ARRANGEMENT
Filed Dec. 15, 1964 7 Sheets-Sheet 3

JOHN HART WILSON
INVENTOR.

BY
Wayland D. Keith
HIS AGENT

July 11, 1967

J. H. WILSON

3,330,164

PIPE ROTATING DEVICE WITH GEAR SHIFT ARRANGEMENT

Filed Dec. 15, 1964

JOHN HART WILSON
INVENTOR.

BY
Wayland D. Keith
HIS AGENT

July 11, 1967

J. H. WILSON 3,330,164

PIPE ROTATING DEVICE WITH GEAR SHIFT ARRANGEMENT

Filed Dec. 15, 1964

JOHN HART WILSON
INVENTOR.

BY

Wayland D Keith
HIS AGENT

JOHN HART WILSON
INVENTOR.

BY
Wayland D Keith
HIS AGENT

United States Patent Office 3,330,164
Patented July 11, 1967

3,330,164
PIPE ROTATING DEVICE WITH GEAR SHIFT
ARRANGEMENT
John Hart Wilson, c/o Wilson Manufacturing Co.,
P.O. Box 1031, Wichita Falls, Tex. 76307
Filed Dec. 15, 1964, Ser. No. 418,504
10 Claims. (Cl. 74—333)

This invention relates to improvements in drilling apparatus and more particularly to a power sub drive mechanism for rotating a string of pipe, drill pipe, or tubing, which normally has a drill bit thereon, or to permit the drill stem to be rotated by a rotary table without material drag because of the power sub drive mechanism.

Various devices have been proposed heretofore for rotating drill pipe within the bore hole of a well to perform a drilling operation, however, the present device not only is adaptable to the rotation of drill pipe within the bore hole of a well, but it may be used for rotating tubing, casing or the like either for making up or breaking out the threaded joints of tubing, pipe, or casing.

The present device is so designed as to rotate pipe, tubing or casing with a predetermined, controllable torque in order that the pipe, tubing or casing will not be twisted off or the threads tightened to such extent as to strip or gall the threads.

A primary purpose of the device is to "spin up" and "spin out" drill pipe or tubing and also to eliminate the use of a spinning rope or chain.

Furthermore, the device may be moved out of gear so the rotation of the pipe is not retarded, while tongs or the like are being used on the pipe to break out or make up the pipe or while it is used in connection with a rotary table to drive the pipe.

The present device is so constructed that it is relatively light in weight, may be readily moved from one location to another, with a minimum of time being required to install the device in operating condition on a string of drill pipe, tubing, casing or the like.

An object of this invention is to provide a drive for rotating tubing or drill pipe and to spin up and spin out drill pipe or tubing.

Another object of this invention is to provide a motor operated drive for rotating pipe or drill stem in the bore hole of a well, which motor operated drive may be remotely controlled.

Another object of the invention is to provide a motor powered drive for rotating tubing or drill stem which will exert a controllable torque for a boring operation for drilling in, which can indicate a change in formation and also which will indicate a dull bit.

Still another object of the invention is to provide a device of heavy construction throughout for rotating pipe for drilling within the bore hole of a well which combines the use of heavy duty chains and heavy duty gears to perform the function of pipe rotation.

Still another object of the invention is to provide a fluid motor driven, pipe rotating device whereby a gear may be readily shifted into or out of mesh with another gear, either to perform a driving operation with the reduction gearing engaged, or to perform a "free wheeling" of the drill pipe sub, the gearing being shifted into disengaged position when it is desired to rotate the drill pipe by other means.

A still further object of the invention is to provide a fluid driven motor drill pipe rotating device having a torque arm thereon, which torque arm is adapted to move with the travelling block, within a mast or derrick, to rotate the pipe for making up and breaking out the pipe and for rotating the pipe for drilling, which pipe rotating device may be readily detached from a torque cable to permit removal thereof from within the derrick or mast when desired.

And still a further object of the invention is to provide a fluid driven pipe rotating device for use in fishing within a well, whereby the pipe or drill stem may be rotated a fraction of a turn when desired.

Still another object of the invention is to provide a pipe rotating device which is fluid driven, which device may be rotated either by air pressure or by hydraulic pressure.

Still another object of the invention is to provide a pipe rotating device, the air pipe rotating motor and the hydraulic pipe rotating motor of which may each be independently disconnected or connected to the gearing mechanism to rotate the pipe.

Still another object of the invention is to provide a pipe rotating device which has separate and independent fluid systems, one of which fluid systems is air and the other of which is hydraulic, both of which systems, including the gearing, may be disconnected from the main drive gear.

And still a further object of the invention is to provide an air control system for remotely actuating the clutches and other mechanisms.

With these objects in mind and others which will become manifest as the description proceeds, reference is to be had to the accompanying drawings in which like reference characters designate like parts in the several views thereof, in which.

Figure 2:
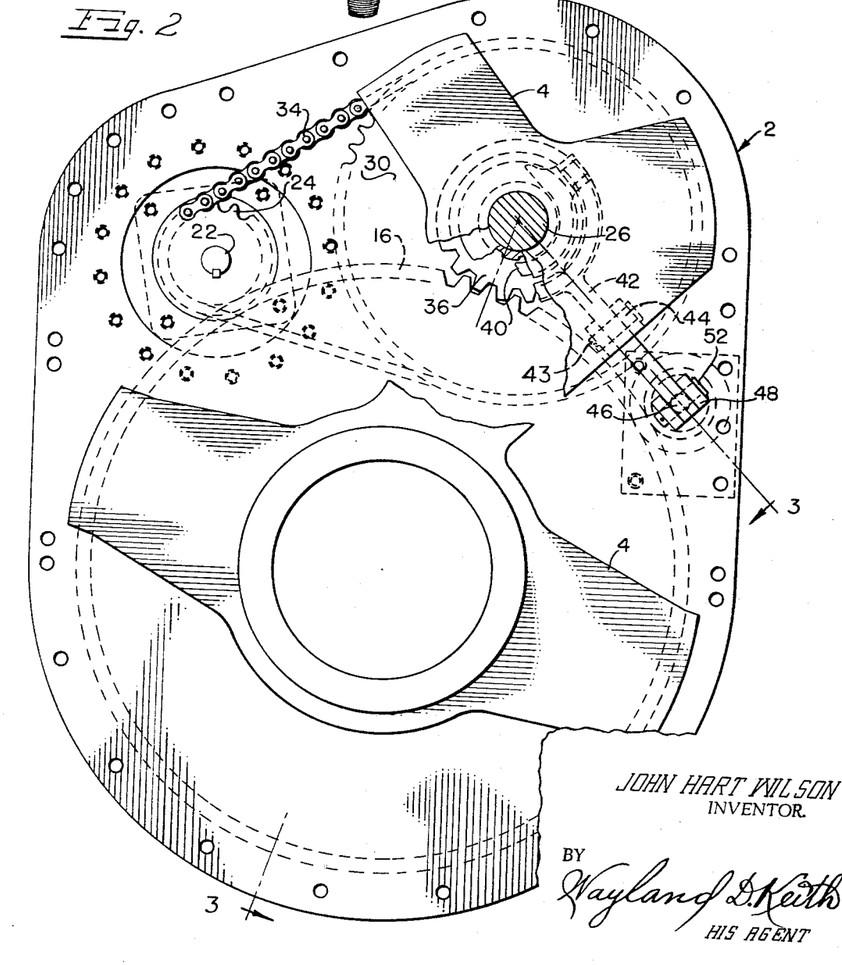
FIG. 2 is a bottom plan view of the pipe rotating device with the casing or housing thereof removed, and with parts being broken away and with parts being shown in section to bring out the details of construction.

With more detailed reference to the drawings the numeral 1 designates generally a support plate for supporting the mechanism of the pipe rotating device. The numeral 2 designates generally a casing or housing which is secured to the mounting plate 1 and which encloses the gearing sprockets and chains, and the gear shifting mechanism, as will be more fully described hereinafter. The mounting plate 1 has a support frame 4 secured thereto as by welding or the like to form a support for rotatable hollow shaft or sub 6 which comprises a short length of thick wall tubing. The hollow shaft or sub 6 extends downward through an opening on the lower side of casing or housing 2 and is journaled within bearings 8 and 10 in housing 2 with seals 12 and 14 preventing entrance of foreign matter thereinto and to retain lubricant within housing 2. A relatively large spur gear 16 is secured to the hollow shaft or sub 6 by a key 18 so as to form a driving connection between the spur gear 16 and the hollow shaft or sub 6.

A fluid motor 20, such as an air or hydraulic motor, is mounted on mounting plate 1 exterior of housing 2 and has a shaft 22 which extends through the mounting plate 1 into the housing 2. A sprocket 24 is secured to shaft 22 for rotation therewith. A further shaft 26 is journaled within bearings 28 and 29 mounted within mounting plate 1 and support plate 4, respectively. A sprocket 30 is mounted on shaft 26 and interfits on splines 32, which splines 32 prevent relative rotation of the sprocket 30 and shaft 26. The sprockets 24 and 30 are in aligned driving relation and a chain 34 surrounds these sprockets in driving relation, so upon rotation of motor shaft 22, the sprocket 24, the sprocket 30, and shaft 26 will be driven. A pinion spur gear 36 is mounted on shaft 26 in longitudinal sliding relation and is prevented from relative rotation with respect to shaft 26 by splines 32. The pinion gear 36 has an annular groove 38 therearound in which is fitted a shifter yoke 40, which shifter yoke is operable by a bifurcated shifter lever 42 which is pivotally mounted on pin 43 on upstanding lugs 44 secured to support frame 4 as by welding and the like.

Figure 1:
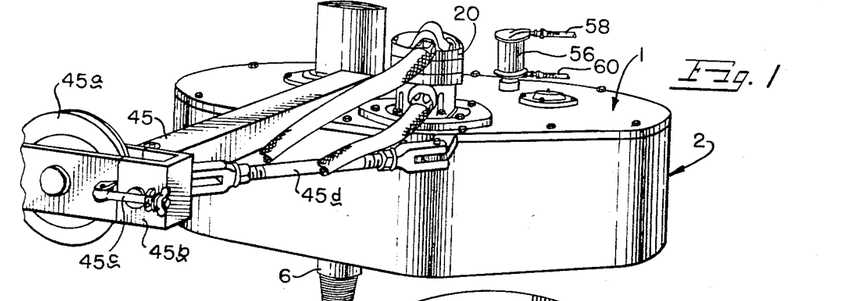
FIG. 1 is a perspective view of the pipe rotating device shown apart from a drilling rig.

The mounting plate 1 has an outwardly extending torque arm 45 secured thereto, the outer end of which torque arm has a sheave pulley 45a journaled therein, with the axis of the torque arm lying in a plane perpendicular to the axis of the hollow shaft 6. The sheave 45a has a guide housing 45b on a side thereof, which housing is held in closed position by a swing bolt 45c abridging a relatively stationary portion and the hingeable portion, so as to hold the hingeable portion in closed position when the hinge bolt is secured in place.

A taut, vertical guide cable is adapted to be positioned within housing 45b so as to be in contact relation with sheave 45a so that the power drive sub may be moved up and down the guide cable (not shown) while torque is being exerted on the drill pipe by tubular member 6. A brace 45d extends between the mounting plate 1 and the sheave housing 45b so as to relieve the torque arm 45 of undue strain or thrust.

Figure 3:
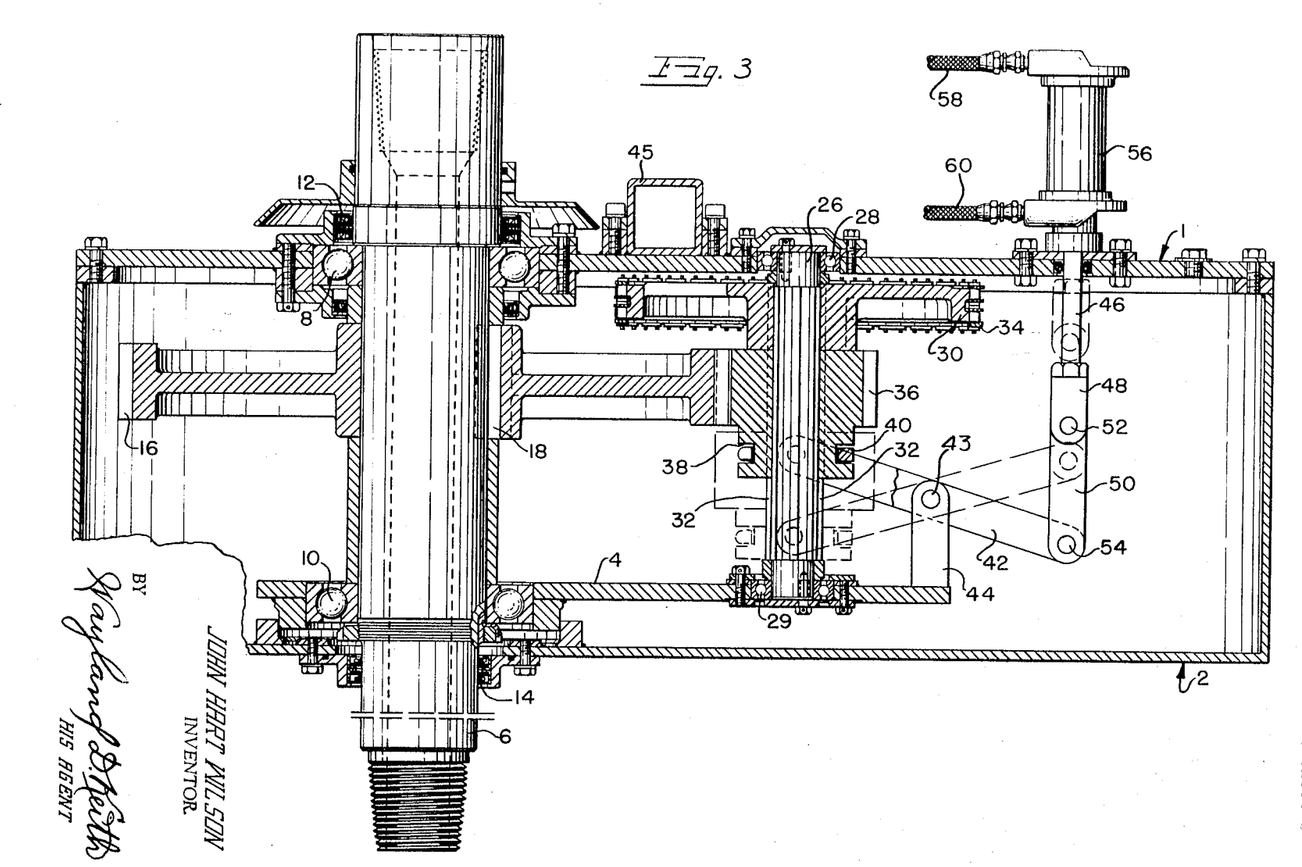
FIG. 3 is a sectional view taken on line 3—3 of FIG. 2, looking in the direction indicated by the arrows to show the mechanism in an extended position to clarify the operation thereof.

A fluid actuated plunger 46 extends through mounting plate 1 and has a clevis 48 thereon which clevis is pivotally connected to a linkage 50 by a pivot pin 52, the other end of linkage 50 is connected by a pivot pin 54 to the shifter lever 42. The fluid actuated plunger 46 is operated by a piston (not shown) within cylinder 56 with hose 58 and 60 extending therefrom to a source of fluid pressure such as air (not shown). Valves are positioned within the hose which extend to the source of fluid pressure, so as to selectively actuate the plunger 46, which in turn moves the pinion gear 36 from the position shown in full outline in FIG. 3 to the position shown in dashed outline therein and vice versa, upon application of fluid pressure through the hose 58 and 60 to the respective opposite ends of cylinder 56 so as to perform the desired function of either engaging the pinion gear 36 with the large spur gear 16, as shown in full outline in FIG. 3, or to disengage the pinion spur gear 36 from large spur gear 16 as shown in dashed outline.

With the large spur gear 18 disengaged from pinion spur gear 36, the hollow shaft or sub 6 and gear 18 are free to rotate, without impedance, when it is desired to rotate the drill pipe with another source of power, as with a rotary table or the like.

*Alternate form of invention*

Figures 4, 5:
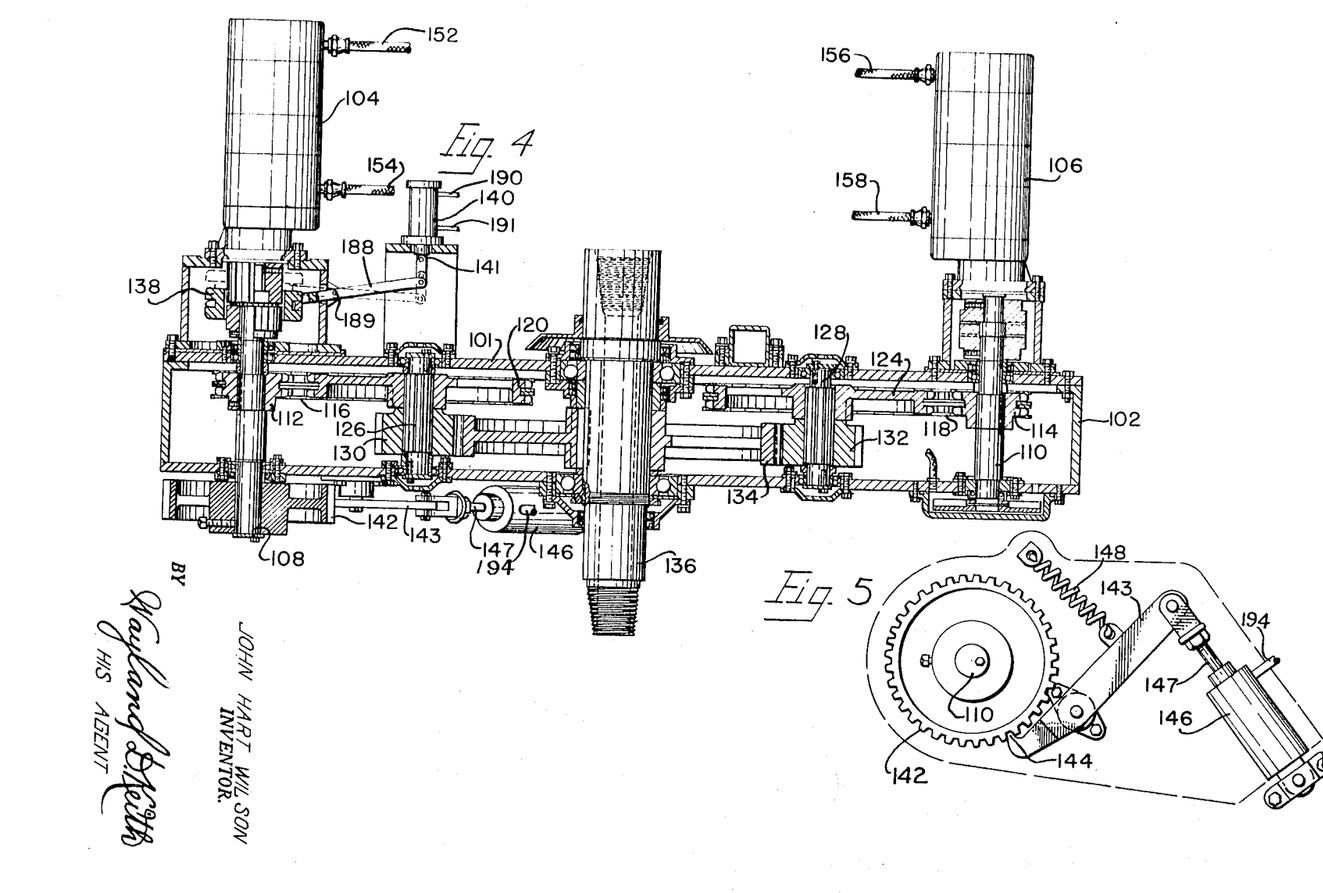
FIG. 4 is a view similar to FIG. 3 except of an alternate form of invention.
FIG. 5 is a fragmentary bottom plan view of the motor drive shaft holding mechanism.

An alternate form of the invention is shown in FIGS. 4 and 5 wherein a mounting plate 101 has a housing 102 mounted on and secured thereto in a manner similar to the above-mentioned form of the invention. However, the modified form of the invention has two fluid drive motors 104 and 106 mounted thereon, which have shafts 108 and 110 respectively therein, on which sprockets 112 and 114 drive through the respective chains 116 and 118, to drive speed reducing sprockets 120 and 124 which are mounted on and fixedly secured to the respective countershafts 126 and 128. Gears 130 and 132 are mounted on the respective countershafts 126 and 128 and rotate therewith. The gears 130 and 132 engage a reduction gear 134 which is keyed to or fixedly secured to hollow shaft 136 in the manner set out above. The shaft 136 is journaled within the housing as in the manner set out for the aforementioned form of the invention.

A clutch 138 is interposed between shaft 108 and motor 104, which clutch is shifted into and out of driving engagement with motor 104 by a fluid actuated cylinder 140 which is mounted on mounting plate 101.

A positive action braking wheel 142 is provided which has teeth thereon that are engageable with a pawl 144 that is actuated by a fluid cylinder such as an air cylinder 146 to disengage the pawl 144 from the teeth of the gear 142 and which pawl is engaged by application of pressure to cylinder 146 so as to maintain the hollow shaft 136 against rotation.

The present arrangement enables twice the amount of power to be used when needed, or by disengaging one motor, greater flexibility can be had at high speeds.

Figure 6:
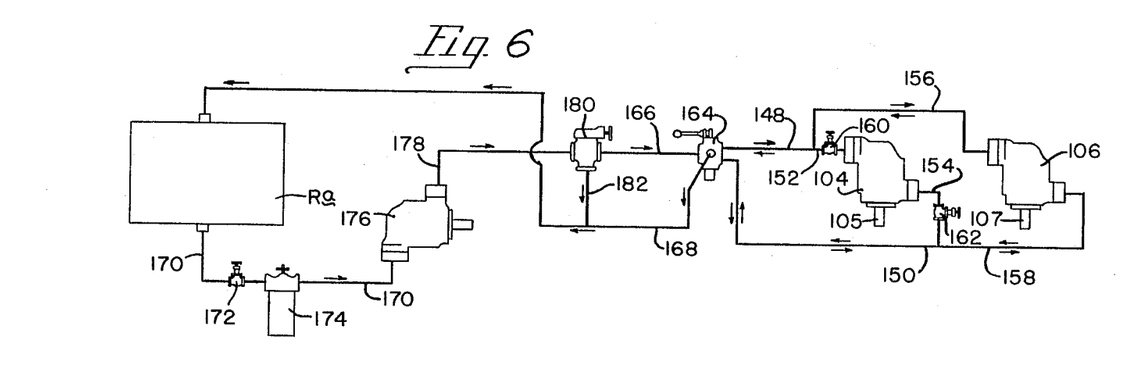
FIG. 6 is a diagrammatic view of the hydraulic system of the form of the invention as shown in FIG. 4.

In this form of the invention a hydraulic system is utilized as is best seen in FIGS. 4 and 6, wherein the hydraulic motors 104 and 106 are connected within a hydraulic circuit, in parallel, by conduits 148 and 150, which conduits have branch conduits 152 and 154 leading to motor 104 and branch conduits 156 and 158 leading to motor 106. The respective conduits 152 and 154 each has a control valve 160 and 162, respectively, therein so that hydraulic motor 104 may be immobilized when desired.

The conduits 148 and 150 lead to a control valve 164 to which conduits 166 and 168 are connected.

A reservoir Ra has a conduit 170 leading therefrom which passes through a valve 172 and filter 174 and to the suction side of pump 176 with the pump discharging the hydraulic fluid out through conduit 178 into and through a relief valve 180 and if the control valve 164 is open and the back pressure in conduit 166 is within safe working limits, the hydraulic fluid will be discharged outward therethrough into conduit 148, and with the valves 160 and 162 open, the hydraulic fluid will be discharged into conduits 152 and 156 simultaneously to act upon hydraulic motors 104 and 106, with the hydraulic fluid being discharged out through branch conduits 154 and 158 into conduit 150 thence through control valve 164 into discharge conduit 168 and into reservoir Ra.

If control valve 164 is closed or if the back pressure in conduit 166 exceeds the safe working limit or the predetermined setting of relief valve 180, the hydraulic fluid will be discharged into and through by-pass 182 and into discharge conduit 168 and into reservoir Ra.

With the control valve 164 moved to an opposite position, hydraulic fluid will be directed from conduit 166 into conduit 150 and when valves 162 and 160 are open, the hydraulic fluid will be directed into branch conduits 154 and 158 and into motors 104 and 106 to rotate the shafts 105 and 107 in the opposite direction from rotation from the preceding setting of control valve 164, with the hydraulic fluid discharging out through branch conduits 152 and 156 into conduit 148 thence into and through control valve 164 into discharge conduit 168 returning to the reservoir Ra.

When it is desired to use only one hydraulic motor such as 106, valves 160 and 162 in branch conduits 152 and 154, that lead to motor 104, may be closed whereby all of the hydraulic fluid passing through control valve 164 into conduits 148 and 150 will be directed to motor 106 which may be operated to rotate the shaft 107 in either direction by control valve 164, as set out above.

Upon directing all of the hydraulic fluid to motor 106, the motor 106 will be driven at twice the speed, which is desirable for spinning the drill stem or pipe at high speeds when the load is relatively light.

Figure 7:
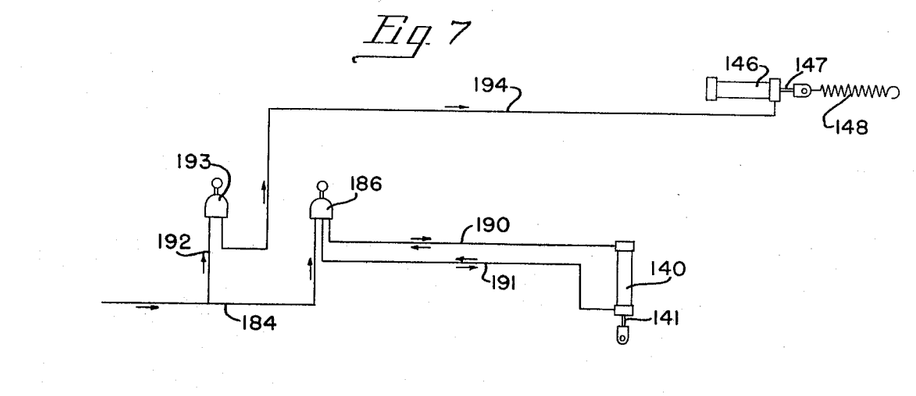
FIG. 7 is a diagrammatic view of the air system of the form of the invention as shown in FIG. 4.

When it is desirable to shift motor 104 out of driving engagement with the sprocket 112, air may be applied through air supply conduit 184, which air is directed through a control valve 186 to cylinder 140 which will actuate a plunger 141 therein to move clutch shifter lever 188 about pivot pin 189 which will shift clutch 138 selectively depending upon the direction in which air is directed into conduits 190 and 191. Upon application of air by control valve 186 into air conduit 190, the plunger 141 will move downward to actuate clutch shifter lever 188 to move the clutch from the full outline position, as shown in FIG. 4, to the dashed outline position as shown in FIG. 4, which will disengage the motor 104 from shaft 108 and the air exhausted from the opposite end of the cylinder 140 will pass back to control valve 186 and be exhausted therefrom. Upon moving the control valve 186 into the opposite position air will be directed through conduit 191 into the piston rod end of cylinder 140 to move the plunger 141 upward to engage clutch 138 with air being discharged outward through air conduit 190 into and through control valve 186 and exhausted therefrom.

A conduit 192 leads from air supply conduit 184 into a two-way air control valve 193 which when in one position will direct air under pressure into conduit 194 and into air cylinder 146 which will move plunger 147 inward against tension of spring 148. The plunger 147 is connected to a lever 143, which lever is pivotally mounted on the lower side of housing 102 which will move a pointed end portion of pawl 144 into engagement with the teeth of gear 142, which will hold the mechanism including hollow shaft 136 against rotation. When it is desired to release the mechanism, air control valve 193 is moved to the opposite position and air is released through conduit 194 and exhausted out through air control valve 193 with the tension spring 148 moving lever 143 and plunger 147 in a position to disengage the pawl 144 or pointed end of lever 143 from gear member 142.

*Second alternate form of invention*

The form of the pipe rotating device, as shown in FIGS. 8 through 13, has a support plate 201 for supporting the mechanism of the pipe rotating device. A housing or casing 202 is mounted on the lower side of the support plate 201 and is secured thereto as by bolts 204. A hollow shaft or drill pipe sub 206 extends through the support plate 201 and through the housing 202, as will best be seen in FIGS. 8 and 10. The hollow shaft 206 is journaled in bearings 208 and 210 in support plate 201 and housing 202 respectively, the seals 212 and 214 in the support plate and housing, respectively prevent entrance of foreign matter into the housing and retains lubricant therein.

Figure 8:
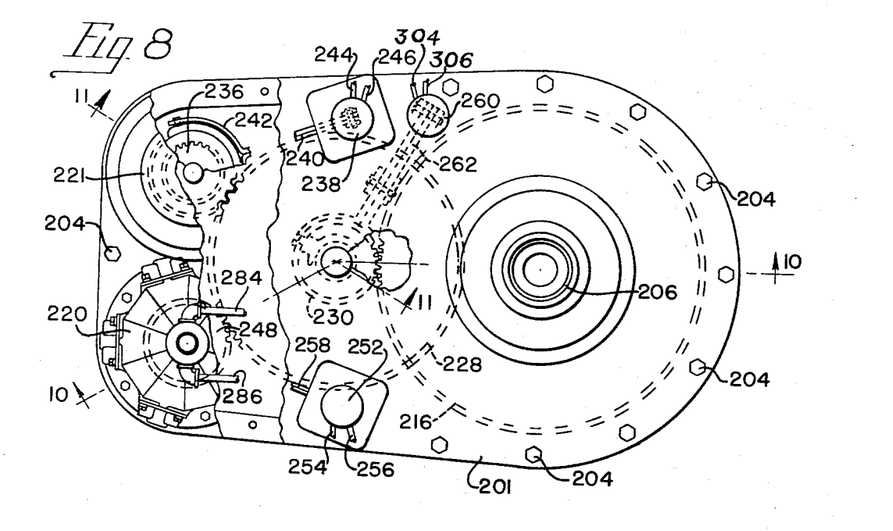
FIG. 8 is a top plan view of a second form of the invention, with parts broken away to bring out the details of construction.
Figure 9:
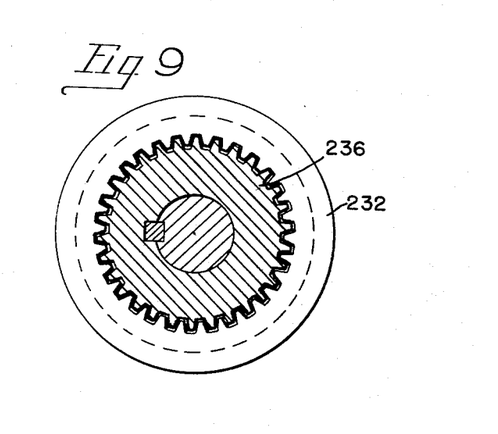
FIG. 9 is a sectional view taken on line 9—9 of FIG. 11, looking in the direction indicated by the arrows.
Figure 10:
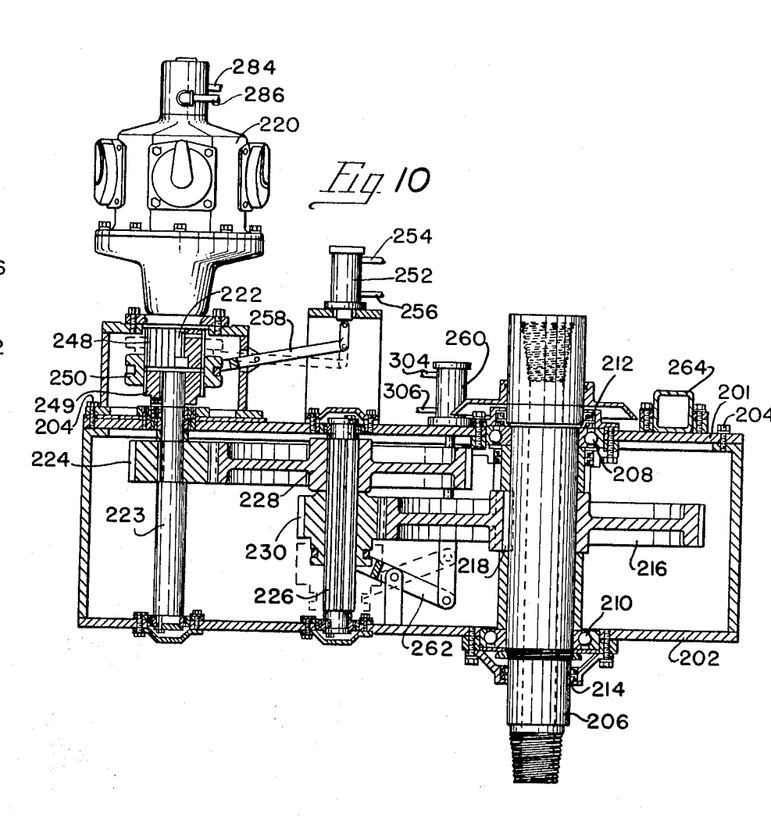
FIG. 10 is a sectional view taken on line 10—10 of FIG. 8, looking in the direction indicated by the arrows, parts thereof being shown in elevation.

A relatively large spur gear 216 is mounted on hollow shaft 206 and is secured thereto by means of a key 218, so as to form a driving connection between the spur gear 216 and the hollow shaft 206. A fluid motor, preferably an air motor 220, is mounted on support plate 201 exterior of the housing 202, on the upper side thereof, which air motor 220 has a shaft 222 therein in aligned relation with the countershaft 223. A spur gear 224 is secured on shaft 222. A further shaft 226 is journaled within housing 202 and is preferably splined. The shaft 226 has a spur gear 228 thereon, which shaft 226 has a second spur gear 230 slidably mounted thereon which is movable longitudinally thereon into and out of meshing engagement with large spur gear 216, as will be more fully brought out hereinafter. A second fluid motor 221, which is a hydraulic motor, is mounted on support plate 201 and is in axially aligned driving relation with a countershaft 223a within housing 202. A spur gear 224a is mounted on and secured to countershaft 223a and is in meshed relation with spur gear 228. The hydraulic motor 221 may be connected in driving relation with countershaft 223a by the shifting of a clutch 232 axially of the countershaft 223, which clutch is known in the trade as a quill clutch, so as to couple the toothed, gear-like members 234 and 236 in driving relation, when the clutch is in the position as shown in full outline in FIG. 11. By shifting clutch 232 into the position, as shown in dashed outline in FIG. 11, the hydraulic motor 221 is disengaged from driving shaft 223a on which gear 224a is mounted.

The shifting of clutch 232 is accomplished by an air actuated cylinder 238, which cylinder has a plunger 239 therein, which is connected through a linkage to the clutch shifter lever 240 having a clutch yoke 242 therein, as is well understood in the art of clutches. Air conduits 244 and 246 are connected to cylinder 238 and are also connected to a suitable control valve, as will be more fully brought out hereinafter. The air motor 220 has conduits 284 and 286 connected thereto and to an air system having control valves therein, as will be more fully brought out hereinafter. The shaft 222 of the air motor has a gear-like member 248 secured thereto which receives a quill clutch 250 thereon, which clutch 250 is similar in operation to the clutch 232. When the clutch 250 is in the position as shown in full outline in FIG. 10, gear-like members 248 and 249 are connected in driving relation with the air motor 220.

Figure 11:
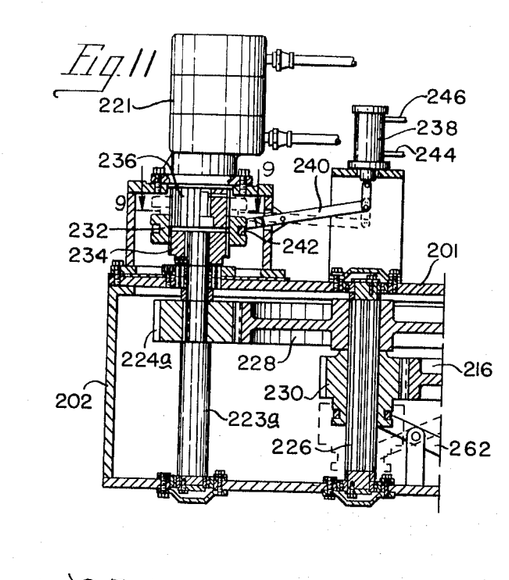
FIG. 11 is a sectional view taken on line 11—11 of FIG. 8, looking in the direction indicated by the arrows.

With the clutch 232 in engaged relation with toothed, gear-like member 234, the countershaft 223a is driven, which in turn drives gear 224a, which gear is mounted on and secured to shaft 223a, which gear 224a is in meshed driving relation with spur gear 228, which gear 228 is mounted on shaft 226 which rotates shaft 226 and gear 230, which gear 230 is in meshed driving relation with large spur gear 216, which will drive the large spur gear 216 at a relatively slow speed, with high torque.

The clutch 250 is actuated by an air cylinder 252 which is mounted on support plate 201. The respective air conduits 254 and 256 are connected to opposite ends of air cylinder 252 and to a suitable source of air under pressure. The conduits have a suitable control valve therein, as will be more fully brought out hereinafter. Upon application of air to one end of air cylinder 252, the lever 258, which is connected to the plunger of air cylinder 252, is actuated through an arc to move the clutch from the position as shown in dashed outline to the full outline position in FIG. 10 to engage the air motor 220 in driving relation. Application of air to the other end of air cylinder 252 will disengage the air motor 220 from driving relation with the gear 224.

The hollow shaft 206 may be rotated either by air motor 220 or by hydraulic motor 221. The air motor 220 is so designed as to drive at relatively high speeds with relatively low torque, and the hydraulic motor 221 drives at relatively low speeds at a relatively high torque.

A shiftable gear is utilized to form a means to connect the shaft 226 in driving relation with hollow shaft 206, when the gear 230 is in one position, and to disconnect the hollow shaft 206 from driving relation with shaft 226, when the gear 230 is in another position. The shiftable gear 230 slides into and out of mesh with large spur gear 216, upon actuation of an air cylinder 260. Upon actuation of air cylinder 260, a gear shifter lever 262 is moved through an arc so as to shift the gear 230 into mesh with large spur gear 216, when in position as shown in full outline in FIGS. 10 and 11, and out of mesh with the large spur gear 216, when shifted into the position shown in dashed outline in FIGS. 10 and 11. A torque arm 264 is mounted transversely of the support plate 201 and is similar in construction to the torque arm 45 shown in FIG. 1, and has a pulley thereon for engagement with a taut cable, so the device may be raised and lowered while the pipe rotating device is being used to rotate pipe.

Figure 12:
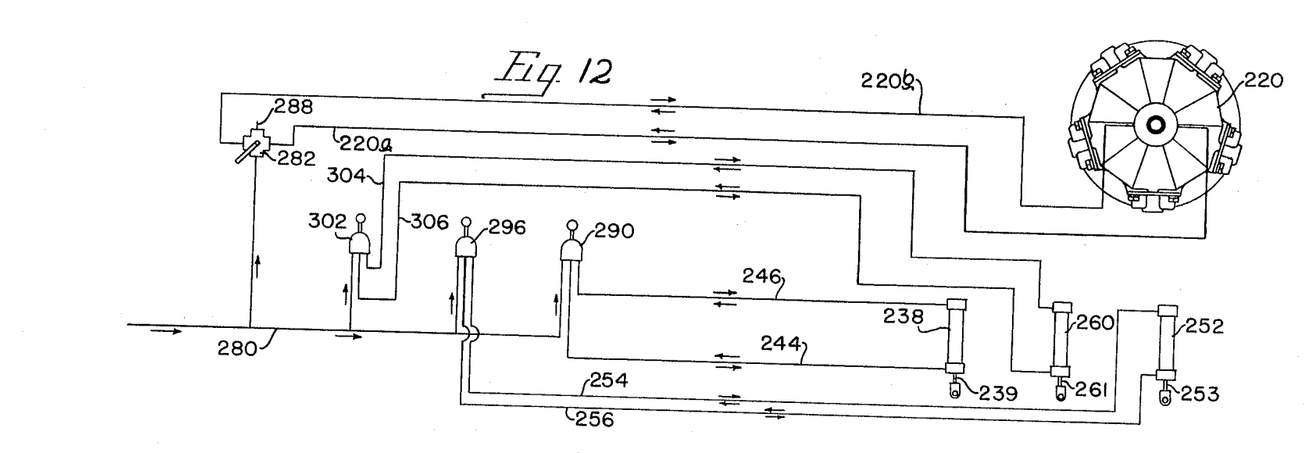
FIG. 12 is a diagrammatic view of the air system of the form of the invention as shown in FIGS. 8 and 10.

To operate the air motor 220, air is introduced through an air supply conduit 280, thence to and through a four-way control valve 282, therefore, by directing air from four-way control valve 282 into conduit 220a, the air will be directed to the air motor 220, which motor is conventional. Air is directed outward from air motor 220 through air outlet conduit 220b to return to the four-way control valve 282 to be exhausted through an exhaust 288. However, by moving the four-way control valve 282 to another position, air will be directed through the four-way control valve 282 into conduit 220b and into air motor 220, thence through exhaust 288, to rotate the air motor 220 in reverse direction.

To actuate the quill clutch 232, air is directed through air supply conduit 280 to air control valve 290, whereupon, by moving the valve to one position, air is directed into conduit 246, into one end of cylinder 238 and the air is exhausted from the other end of cylinder 238 through conduit 244 into and through air control valve 290 to be exhausted to atmosphere, whereupon the plunger 239 is moved downward, which will shift the clutch 232 out of engagement. To engage the clutch 232 the valve 290 is moved to an opposite position to direct air into conduit 244 and into the lower end of cylinder 238, with the air being exhausted therefrom into conduit 246 into and through air control valve 290 to move the plunger 239 upward to shift the clutch 232 into engagement with toothed, gear-like member 234.

A second air control valve 296 is provided, thereby air is directed thereinto from air supply conduit 280, air is directed from control valve 296 into a conduit 254 into the upper end of air cylinder 252 to move the plunger 253 downward which discharges air into and through conduit 256 into and through the air control valve 296 and the air is exhausted therefrom. Whereupon clutch 250 is moved from an engaged position, as shown in full outline in FIG. 10, to a disengaged position, as shown in dashed outline in FIG. 10. To engage the clutch 250, the air control valve 296 is moved to an opposite position to direct the air from air supply conduit 280 into conduit 256 and into air cylinder 252 to move the plunger 253 upward, discharging air out through conduit 254 into and through air control valve 296, from which it is exhausted to the atmosphere.

By moving the plunger 253 upward the clutch 250 is shifted from the dashed outline position as shown in FIG. 10, to the full outline position, as shown in FIG. 10, to engage gear-like member 249 so as to connect the air motor 220 in driving relation with countershaft 223, so as to drive through gears 224, 228, shaft 226, gear 230, and large spur gear 216 to rotate the hollow shaft or drill pipe sub 206.

The air motor 220 and hydraulic motor 221 may be used independently, which will enable making up or breaking out tight threads with the hydraulic motor 221, and the spinning out or spinning up the pipe with air motor 220. However, when the present device is used in connection with a rotary table, it is often desirable to completely release the large spur gear 216 from engagement with any other gears so that the drill stem, to which the hollow shaft 206 is connected, may be rotated by the rotary table without unnecessary friction caused by the driving of the gear train within housing 202.

The gear 230 is shifted into and out of engagement by an air control valve 302, which directs air from air supply conduit 280 into conduit 304, thence to the upper end of air cylinder 260 to move the plunger 261 downward, thereby the air is discharged therefrom into conduit 306 and exhausted out through air control valve 302. This will move the plunger 261 downward, which in turn will move the gear 230 into engagement with large spur gear 216. By directing air into conduit 306 to the lower end of air cylinder 260, the plunger 261 will be moved upward and air will be discharged out through conduit 304 to air control valve 302 and exhausted to atmosphere. In so doing, the spur gear 230 will be shifted out of engagement with large spur gear 216, as shown in dashed outline in FIG. 10, so as to permit the large spur gear 216 to rotate freely with hollow shaft 206.

Figure 13:
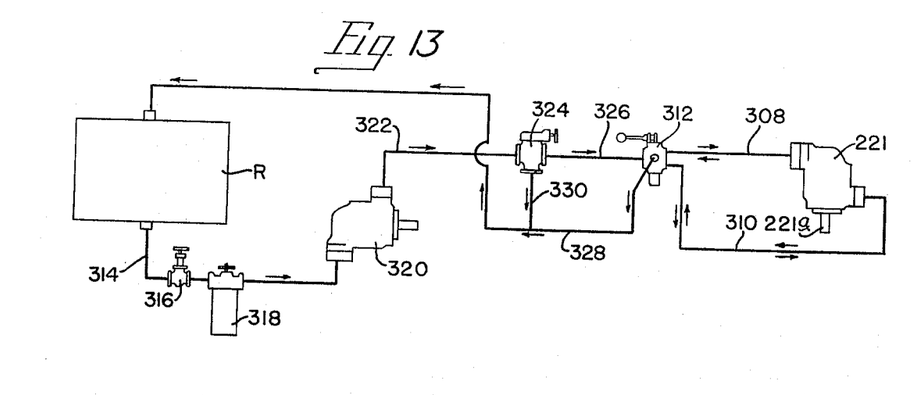
FIG. 13 is a diagrammatic view of the hydraulic system of the form of the invention as shown in FIGS. 8 and 11.

The hydraulic motor 221 has conduits 308 and 310 connected thereto and to a control valve 312 which will enable the hydraulic fluid to be withdrawn from reservoir R and directed out through conduit 314, valve 316, filter 318 into the suction side of a hydraulic pump 320. The hydraulic fluid will be discharged outward through a conduit 322 into relief valve 324 which relief valve is so regulated so as to discharge hydraulic fluid into conduit 326 and into control valve 312 whereby the hydraulic fluid may be selectively discharged therefrom into conduit 308 and hydraulic fluid 221 with the hydraulic motor exhausting out through conduit 310 into the hydraulic control valve 312 then through hydraulic conduit 328 into reservoir R.

If the control valve 312 is closed or if the back pressure in conduit 326 exceeds the safe working limit of the system, the relief valve will discharge or by-pass the hydraulic fluid through by-pass conduit 330 into return conduit 328 to the reservoir R.

The control valve may be selectively shifted to direct hydraulic fluid under pressure into conduit 310 and discharge the fluid out through conduit 308 into control valve 312 to discharge and to return conduit 328 and into reservoir R. In this manner shaft 221a of the hydraulic motor will be rotated in the reverse direction from the aforementioned operation.

Having thus clearly shown and described the invention, what is claimed as new and is desired to be secured by Letters Patent is:

1. In a power sub for rotating drill pipe and the like;
    (a) a mounting plate,
    (b) a housing mounted on said mounting plate,
    (c) a hollow shaft extending through said mounting plate and said housing and being journaled therein,
    (d) a gear fixedly mounted on said hollow shaft,
    (e) a countershaft mounted within said housing in journaled relation,
    (f) a gear mounted on said countershaft in longitudinal sliding relation thereto and being fixed against relative rotation with respect thereto,
    (g) shift means connected to said gear on said countershaft to move said gear longitudinally thereof while said gear is maintained in relative, non-rotatable relation with respect to said countershaft,
    (h) fluid actuated means connected to said shift means to move said gear longitudinally on said countershaft into meshed engagement with said gear on said hollow shaft, when said shift means is in one position, and to move said gear on said countershaft out of meshed engagement with said gear on said hollow shaft, when said shift means is in another position,
    (i) a motor mounted on said mounting plate, and
    (j) transmission means connecting said motor in driving relation with said countershaft to operatively rotate said countershaft and said gear thereon.

2. In a power sub for rotating drill pipe and the like, as defined in claim 1; wherein
    (a) said fluid actuated shift means is an air actuated cylinder mounted on said mounting plate with a plunger operatively fitted within said cylinder,
    (b) an air conduit connected to each end of said air actuated cylinder,
    (c) a control valve within said air conduits, and
    (d) a source of air under pressure connected to said air control valve to enable said air actuated cylinder to be operated by remote control.

3. A power sub for rotating drill pipe and the like, as defined in claim 2; wherein (a) a support frame is secured to said mounting plate a spaced distance therebelow, and being within said housing,
(b) said shift means is a shift lever pivotally mounted on said support frame,
(c) said air actuated cylinder being pivotally connected to said shift lever within said housing, and
(d) said shift lever being connected to said gear on said countershaft to move said gear longitudinally on said countershaft, upon actuation of said plunger in said air actuated cylinder.

4. A power sub for rotating drill pipe and the like as defined in claim 2; wherein
(a) a support frame is secured to said mounting plate a spaced distance therebelow,
(b) a bearing on said support frame and a bearing on said mounting plate, which bearings are in axially aligned relation,
(c) said hollow shaft being journaled in said bearings,
(d) a second bearing mounted on said mounting plate a spaced distance from said first mentioned bearing on said mounting plate,
(e) a second bearing mounted on said support frame is axial alignment with said second bearing on said mounting plate,
(f) said countershaft is journaled in said second bearings and is in parallel relation with said hollow shaft,
(g) said gear mounted on said countershaft being a pinion gear and being movable into and out of engagement with said gear on said hollow shaft, which gear is a spur gear,
(h) a shifter yoke pivotally mounted on said support frame, one end of which shifter yoke is operatively connected with said pinion gear for moving said pinion gear longitudinally of said countershaft and permitting relative rotation of said pinion gear and said countershaft with respect thereto,
(i) said fluid actuated means being a cylinder mounted on said mounting plate,
(j) a portion of said plunger of said fluid cylinder extending through said mounting plate and having a pivot member on the lower end thereof, and
(k) a linkage, one end of which linkage is pivotally attached to said plunger, the other end of said linkage being pivotally attached to said shifter yoke to move said shifter yoke arcuately, upon movement of said plunger.

5. In a power sub for rotating drill pipe and the like,
(a) a mounting plate,
(b) a housing mounted on said mounting plate,
(c) a hollow shaft extending through said mounting plate into said housing,
(d) gear means mounted on said hollow shaft,
(e) a splined countershaft mounted within said housing,
(f) a motor mounted on said mounting plate,
(g) transmission means connecting said motor in driving relation with said countershaft,
(h) a splined shift gear complementally engaging said splined countershaft and being longitudinally movable thereon, and non-rotatable with respect thereto to selectively connect said countershaft in geared relation with said hollow shaft,
(i) air actuated means operatively connected to said shift gear to selectively move said shift gear on said countershaft,
(j) control valve means connected to said air actuated means connected to said shift gear on said countershaft to selectively actuate said shift gear from a remote point, and
(k) a source of air under pressure connected to said control valve.

6. In a power sub for rotating drill pipe and the like;
(a) a mounting plate,
(b) a housing mounted on said mounting plate,
(c) a hollow shaft extending through said mounting plate and into said housing and being journaled therein,
(d) gear means mounted on and secured to said hollow shaft,
(e) a plurality of motors mounted on said mounting plate, each of which motors has an outwardly extending shaft,
(f) a clutch shaft journaled on said housing,
(g) a clutch mounted on said clutch shaft for longitudinal sliding movement thereon and being fixed against relative rotation with respect thereto,
(h) a companion clutch shaft mounted on said housing in axial alignment with respect to said clutch shaft,
(i) a companion clutch portion mounted on said companion clutch shaft,
(j) the outwardly extending shaft of at least one of said motors being connected to one of said clutch shafts in power transmitting relation,
(k) power transmission gearing interconnecting the gear means on one of the clutch shafts and said gear means on said hollow shaft in power transmission relation,
(l) fluid actuated means operatively connected to said clutch to selectively move said clutch on said clutch shaft to selectively engage said clutch with said companion clutch portion on said companion clutch shaft to operatively connect at least one of said motors and said power transmission gearing in driving relation with said hollow shaft, when said clutch on said clutch shaft and said clutch portion on said companion clutch shaft are in one position, and to selectively disengage said clutch on said clutch shaft from said clutch portion on said companion clutch shaft, when said fluid actuated means moves said clutch to another position to disconnect one of said clutch shafts from said transmission gearing and said hollow shaft.

7. A power sub for rotating drill pipe and the like, as defined in claim 6; wherein
(a) said motors are fluid driven motors, and
(b) said fluid actuating means is an air cylinder having a plunger operatively mounted therein.

8. In a power sub for rotating drill pipe and the like;
(a) a support plate,
(b) a housing mounted on said support plate,
(c) a hollow shaft extending through said support plate into and through said housing,
(d) a gear mounted on and secured to said hollow shaft,
(e) a plurality of counter-shafts mounted within said housing in journaled relation,
(f) a plurality of motors each having a shaft mounted on said support plate,
(g) a plurality of shafts mounted in journalled relation in said housing, each said shaft being connectable in driving relation with the shaft of one of said motors,
  (1) at least one of said plurality of shafts being a clutch shaft,
  (2) a clutch portion mounted on said clutch shaft and being movable longitudinally thereof and being fixed against relative rotation with respect thereto,
  (3) a clutch portion mounted on at least one of said motor shafts,
  (4) said clutch portion mounted on said clutch shaft being relatively movable with respect to said clutch portion mounted on said motor shaft to selectively connect at least one of said motors in driving relation with said clutch shaft,
(h) gear means mounted on and secured to each of said plurality of shafts, (i) gear means on each of said countershafts and fixed against relative rotation with respect thereto, (j) further gear means mounted on and fixedly secured to each of said countershafts and being connected in geared relation to said gear on said hollow shaft, and (k) operator means connected to said movable clutch portion to selectively actuate said clutch portion remotely therefrom.

9. In a power sub for rotating drill pipe and the like, as set forth in claim 8, wherein:

(a) said clutch positions form a clutch means positioned intermediate at each of said motor shafts and each shaft of said plurality of shafts, and (b) each said motors adapted to be selectively disconnected from said respective clutch shafts by said clutch means.

10. In a power sub for rotating drill pipe and the like as set forth in claim 8, wherein:

(a) one of said shafts connected in driving relation with said hollow shaft has a toothed, gear-like member mounted thereon and secured thereto exterior of said housing, (b) a pawl-like member engageable with the teeth of said toothed, gear-like member, and (c) air cylinder means connected to said pawl-like member to move said pawl-like member relative to said teeth to lock said gear-like member against rotation.

References Cited

UNITED STATES PATENTS

| 3,105,675 | 10/1963 | Blackburn | 74—342 |
| 3,144,085 | 8/1964 | Hasha | 173—164 |
| 3,191,450 | 6/1965 | Wilson | 173—163 |

DONLEY J. STOCKING, *Primary Examiner.*

DAVID J. WILLIAMOWSKY, *Examiner.*

H. S. LAYTON, *Assistant Examiner.*